United States Patent
Bisht

(10) Patent No.: US 10,831,786 B2
(45) Date of Patent: Nov. 10, 2020

(54) AGGREGATING KEY METRICS ACROSS AN ACCOUNT HIERARCHY

(71) Applicant: Microsoft Technology Licensing, LLC, Redmond, WA (US)

(72) Inventor: Lokesh Bisht, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 639 days.

(21) Appl. No.: 15/264,723

(22) Filed: Sep. 14, 2016

(65) Prior Publication Data

US 2018/0075129 A1 Mar. 15, 2018

(51) Int. Cl.
*G06F 16/28* (2019.01)
*G06F 16/242* (2019.01)

(52) U.S. Cl.
CPC .......... *G06F 16/285* (2019.01); *G06F 16/244* (2019.01)

(58) Field of Classification Search
CPC ............................. G06F 16/285; G06F 16/244
USPC .................................................. 707/609, 737
See application file for complete search history.

(56) References Cited

U.S. PATENT DOCUMENTS

| | | | | |
|---|---|---|---|---|
| 7,680,696 B1* | 3/2010 | Murray | ............. | G06Q 30/0611 705/26.4 |
| 8,065,192 B2* | 11/2011 | Johansson | .......... | G06Q 30/0605 705/26.2 |
| 2002/0129017 A1* | 9/2002 | Kil | ...................... | G06F 16/2465 707/999.006 |
| 2004/0122692 A1* | 6/2004 | Irving | ................. | G06Q 50/205 709/225 |
| 2006/0056415 A1* | 3/2006 | Lee | ........................ | H04L 12/14 370/392 |
| 2009/0043670 A1* | 2/2009 | Johansson | ............. | G06Q 30/06 705/26.2 |
| 2010/0274610 A1* | 10/2010 | Andersen | ............. | G06Q 10/087 705/28 |
| 2014/0297342 A1* | 10/2014 | Ogata | ................... | G06F 16/288 705/7.11 |
| 2018/0039681 A1* | 2/2018 | Gavryushenko | ...... | G06F 16/284 |

* cited by examiner

*Primary Examiner* — Phong H Nguyen
(74) *Attorney, Agent, or Firm* — Schwegman Lundberg & Woessner, P.A.

(57) ABSTRACT

System and methods for aggregating key metrics across an account hierarchy are disclosed. The server system accesses a first transaction record, wherein the first transaction is categorized into a first category. The server system analyzes an account record associated with the first account to determine a parent account of the first account. The server system identifies a second transaction record associated with a second account. The server system compares a first address of record for the first account to a second address of record for the second account. In accordance with a determination that the first address of record matches the second address of record, the server system aggregate the first transaction and a second transaction listed in the second transaction record into a combined transaction. The server system categorizes the combined transaction into a second category, wherein the second category is different from the first category.

20 Claims, 14 Drawing Sheets

| FIRST ROW 502 | SECOND ROW 510 | ULTIMATE PARENT 518 |
|---|---|---|
| A 504 | B 506 | Z 520 |
| B 506 | C 514 | Z 520 |
| D 508 | A 504 | Z 520 |

FIG. 5A

AGGREGATING KEY METRICS ACROSS AN ACCOUNT HIERARCHY

TECHNICAL FIELD

The disclosed example embodiments relate generally to online systems and, in particular, to efficient aggregation in relational databases with account hierarchies.

BACKGROUND

Large server systems store a large amount of data. Such data can be stored in a database, such as a relational database system. To deal with the large amount of data, large servers can organize the data. One way to organize large amounts of data is to do so by the account from which the data originated. In some example embodiments, accounts can be part of a larger account hierarchy.

Some types of data, like transaction records, need to be assigned to a particular category based on the size, location, or type of account associated with that data. Furthermore, two accounts in the same account hierarchy may be grouped into different categories. In some cases, transactions from related accounts should be grouped when determining which category the transactions are included in. Without prior indication of how grouping should be done, a larger server system needs to analyze data in real time to group transactions properly.

DESCRIPTION OF THE DRAWINGS

Some example embodiments are illustrated by way of example and not limitation in the figures of the accompanying drawings.

FIG. 5A is a depiction of a table that shows the results of comparing multiple account records with the goal of finding accounts that have the same ultimate parent, in accordance with an example embodiment.

Like reference numerals refer to corresponding parts throughout the drawings.

DETAILED DESCRIPTION

Figure 1:
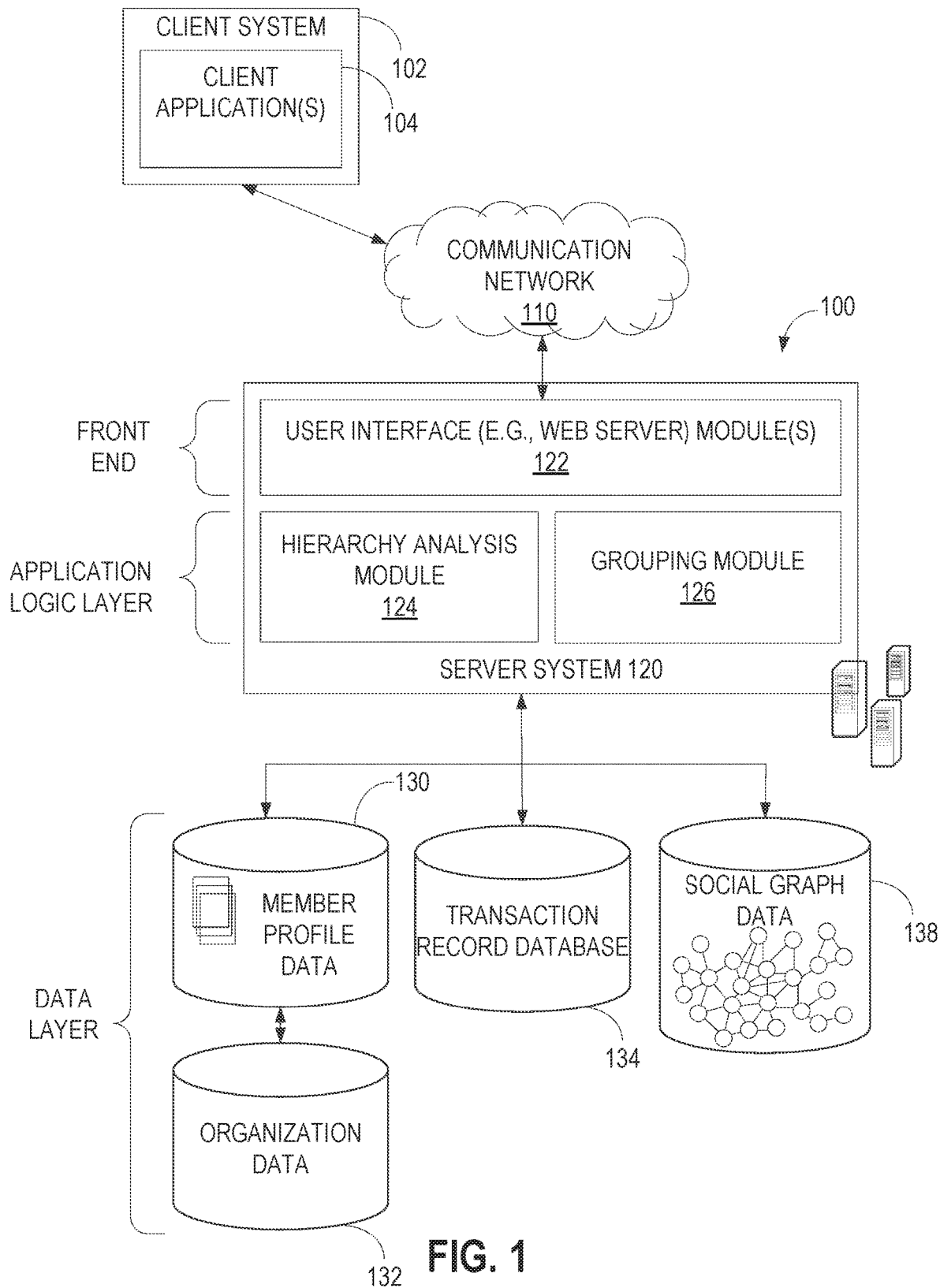
FIG. 1 is a network diagram depicting a client-server system that includes various functional components of a server system, in accordance with some example embodiments.

The present disclosure describes methods, systems, and computer program products for aggregating quantities and other key metrics across an account hierarchy. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

A large server system can provide services for a large number of members. Some of the members are organizations (e.g., companies, clubs, non-governmental organizations, and so on). Members can conduct transactions (transactions may also be referred to as interactions) with the server system including data storage and retrieval, sharing, purchases and sales, and so on. In some example embodiments, each transaction is stored as a transaction record in a database associated with the server system.

In some example embodiments, each transaction can be categorized into one of a plurality of categories based on the characteristics of the transaction. For example, some document storage regulations for organizations over a certain size are mandatory by law. In another example, data primarily originating from a first country may have location storage requirements related to the country of storage.

In some example embodiments, some member organizations of the server system are part of a large organization hierarchy that includes subsidiaries, parent organizations, different locations or offices, and so on. However, organizations do not always formally list their relationships to other member organizations of the server system (e.g., parent organizations, sibling organizations, child organizations). However, grouping organizations based on their places in organizational hierarchies enables the server system to group additional transactions together. Grouping transactions together can result in different classifications for those transactions.

For example, one type of transaction is grouped by organization size. Thus, the server system determines the size of a first organization by first determining a list of organizations that should be grouped with the first organization based on the organizations being part of the same organizational structure.

To group organizations, the server system first determines an ultimate parent for each organization. This represents the organization that is the highest in a given organization's hierarchy. The server system then determines a source address for the organization (e.g., a source address can be the address where bills associated with the server system are sent).

Using the ultimate parent and the source address, the server system can compare any two organizations to determine whether the two are sibling organizations (e.g., are sufficiently connected to warrant grouping). In other example embodiments, the server system also determines the hierarchy level of each organization. The server system then only groups organizations of similar or the same hierarchy levels.

FIG. 1 is a network diagram depicting a client-server system environment 100 that includes various functional components of a server system 120, in accordance with some example embodiments. The client-server system environment 100 includes one or more client systems 102 and the server system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and receive requests to and from the server system 120 and to display information received from the server system 120.

In some example embodiments, the client system 102 includes an application specifically customized for communication with the server system 120 (e.g., a LinkedIn iPhone application). In some example embodiments, the server system 120 is a server system that is associated with one or more services.

In some example embodiments, the client system 102 sends a request to the server system 120 to perform a particular transaction. For example, a member uses the client system 102 to log into the server system 120 and request that a particular piece of data be stored in the server system 120. In response, the client system 102 receives confirmation that the data has been stored and, in some example embodiments, information about where the data is stored.

In some example embodiments, as shown in FIG. 1, the server system 120 is generally based on a three-tiered architecture, consisting of a front-end layer, application logic layer, and data layer. As is understood by skilled artisans in the relevant computer and Internet-related arts, each or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the server system 120 is depicted in FIG. 1 as having a three-tiered architecture, the various example embodiments are by no means limited to this architecture.

As shown in FIG. 1, the front end consists of a user interface module (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the server system 120, including member profile data 130, organization data 132, a transaction record database 134, and social graph data 138, which is data stored in a particular type of database that uses graph structures with nodes, edges, and properties to represent and store data. Of course, in various alternative example embodiments, any number of other entities might be included in the social graph. For example, the social graph can include organizations, which includes any of companies, schools and universities, religious groups, non-profit organizations, governmental organizations, non-government organizations (NGOs), clubs, civic organizations, interest groups, political organizations, and any other group) and, as such, various other databases may be used to store data corresponding with other entities.

Consistent with some example embodiments, when a person initially registers to become a member of the server system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online server systems, and so on. This information is stored, for example, in the member profile data 130.

In some example embodiments, the member profile data 130 includes or is associated with member interaction data. In other example embodiments, the member interaction data is distinct from, but associated with, the member profile data 130. The member interaction data stores data detailing the various interactions each member has through the server system 120. In some example embodiments, interactions include posts, likes, messages, storing or retrieving data, buying or selling products or services, recruiting, messaging, adding or removing social contacts, and adding or removing member content items (e.g., a message or the like). In other example embodiments, other interactions are general interactions (e.g., posting a status update) and are not related to another particular member. Thus, if a given member interaction is directed towards or includes a specific member, that member is also included in the membership interaction record.

In some example embodiments, the member profile data 130 includes the organization data 132. In some example embodiments, the organization data 132 includes one or more organization records, each of which details a particular organization that is associated with the server system 120. As noted above, organizations can include any of companies, educational organizations (e.g., schools, universities, and so on), religious groups, non-profit organizations, governmental organizations, non-government organizations (NGOs), clubs, civic organizations, interest groups, political organizations, and any other group. In some example embodiments, the organization data 132 further includes other information for organizations that are members of the server system 120 including, but not limited to, any parent organizations or subsidiaries, a source location for the organization (e.g., where bills can be sent), an area of business associated with the organization, a list of members associated with the organization (e.g., employees, owners, board members, customers, and so on), and so on.

In some example embodiments, the transaction record database 134 includes a list of transactions that have been performed or requested for the server system 120. For example, if an organization wishes to display an advertisement to the members of the server system 120, the request for that service would be stored in the transaction record database 134. Once the transaction had been completed (e.g., the service was performed and payment rendered), the completed transaction record would be updated in the transaction record database 134 to reflect the completed transaction.

In some example embodiments, transaction records include information about the transaction, such as the organization that requested or initiated the transaction, the specific transaction details, the classification of the transaction, and so on.

Once registered, a member may invite other members, or be invited by other members, to connect via the server system 120. A "connection" may include a bilateral agreement by the members, such that both members acknowledge the establishment of the connection. Similarly, in some example embodiments, a member may elect to "follow" another member. In contrast to establishing a "connection," the concept of "following" another member typically is a unilateral operation and, at least in some example embodiments, does not include acknowledgement or approval by the member that is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are represented in the social graph data 138.

The server system 120 may provide a broad range of other applications and services that allow members the opportunity to share and receive information, often customized to the interests of the member. In some example embodiments, the server system 120 may include a photo sharing application that allows members to upload and share photos with other members. As such, at least in some example embodiments, a photograph may be a property or entity included within a social graph. In some example embodiments, members of the server system 120 may be able to self-organize into groups, or interest groups, organized around a subject or topic of interest. In some example embodiments, the data for a group may be stored in a database. When a member joins a group, his or her membership in the group will be reflected in the member profile data 130 and the social graph data 138.

In some example embodiments, the application logic layer includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the server system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A hierarchy analysis module 124 or a grouping module 126 can also be included in the application logic layer. Of course, other applications or services that utilize the hierarchy analysis module 124 or the grouping module 126 may be separately implemented in their own application server modules.

As illustrated in FIG. 1, in some example embodiments, the hierarchy analysis module 124 and the grouping module 126 are implemented as services that operate in conjunction with various application server modules. For instance, any number of individual application server modules can invoke the functionality of the hierarchy analysis module 124 and the grouping module 126. However, in various alternative example embodiments, the hierarchy analysis module 124 and the grouping module 126 may be implemented as their own application server modules such that they operate as standalone applications.

Generally, the hierarchy analysis module 124 receives a transaction record for a transaction. In some example embodiments, the hierarchy analysis module 124 identifies a first organization associated with the received transaction. Once the first organization has been identified, the hierarchy analysis module 124 determines whether the first organization has a parent organization.

If so, the hierarchy analysis module 124 identifies the ultimate parent of the first organization. To do this, the hierarchy analysis module 124 finds the parent organization of the first organization. The hierarchy analysis module 124 can then determine whether the parent organization itself has a parent organization. This continues until a parent organization without any further parent organization is identified. This organization is the top of the hierarchy and is the ultimate parent organization.

In some example embodiments, the grouping module 126 analyzes the details of a given transaction and classifies the transaction into one group of a plurality of groups based on the details. For example, the size of the data to be stored can determine what type of data storage the data is stored in. Similarly, the server system may have a policy that if a certain percentage of data from a given organization is generated in a particular country, then the data from that organization is stored solely, or at least primarily, in that particular country. In another example, the size of an order can determine which pricing tier the organization receives.

In some example embodiments, some of the transactions are submitted by organizations that are part of the same hierarchy and should be grouped together to identify the correct categorization. For example, two orders from two organizations should be combined together for pricing consideration. To group organizations together, the grouping module 126 first determines the ultimate parent of the first organization. Then the grouping module 126 identifies any other similar outstanding transactions from organizations with the same ultimate parent (as determined by the hierarchy analysis module 124).

Once a second organization with the same ultimate parent organization is determined, the hierarchy analysis module 124 determines a source address (e.g., a billing address) for both the first organization and the second organization. If the source addresses match, the transaction records of the transaction associated with the second organization are altered to list the first organization instead, and the two transactions are combined.

In some example embodiments, the grouping module 126 then re-categorizes the transaction into a new grouping and updates the transaction record with the new grouping.

Figure 2:
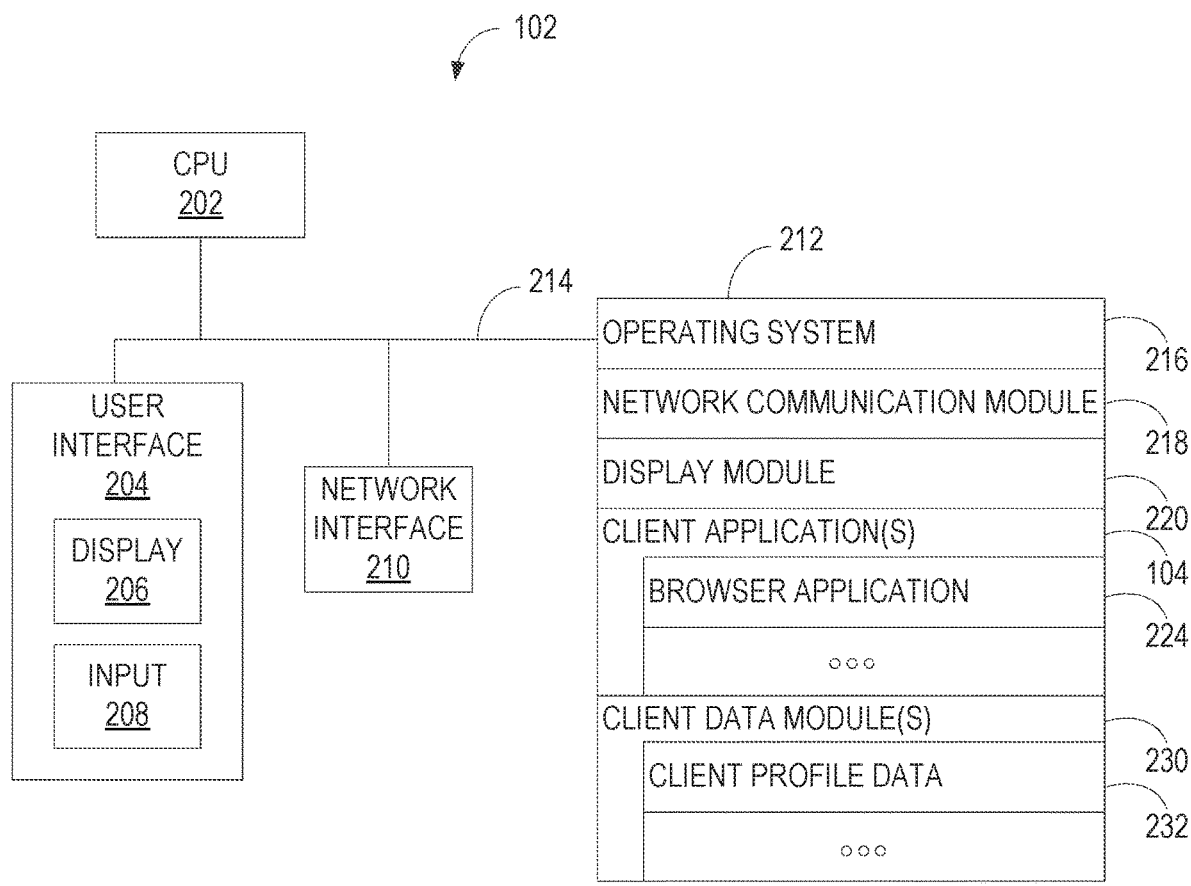
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:
- an operating system 216 that includes procedures for handling various basic system services and for performing hardware-dependent tasks;
- a network communication module 218 that is used for connecting the client system 102 to other computers via the one or more network interfaces 210 (wired or wireless) and one or more communication networks 110, such as the Internet, other WANs, LANs, metropolitan area networks (MANs), etc.;
- a display module 220 for enabling the information generated by the operating system 216 and client application(s) 104 to be presented visually on the display device 206;
- one or more client applications 104 for handling various aspects of interacting with the server system 120 (FIG. 1), including but not limited to:
    - a browser application 224 for requesting information from the server system 120 and receiving responses from the server system 120; and
- client data module(s) 230 for storing data relevant to clients, including but not limited to:
    - client profile data 232 for storing profile data related to a member of the server system 120 associated with the client system 102.

Figure 3:
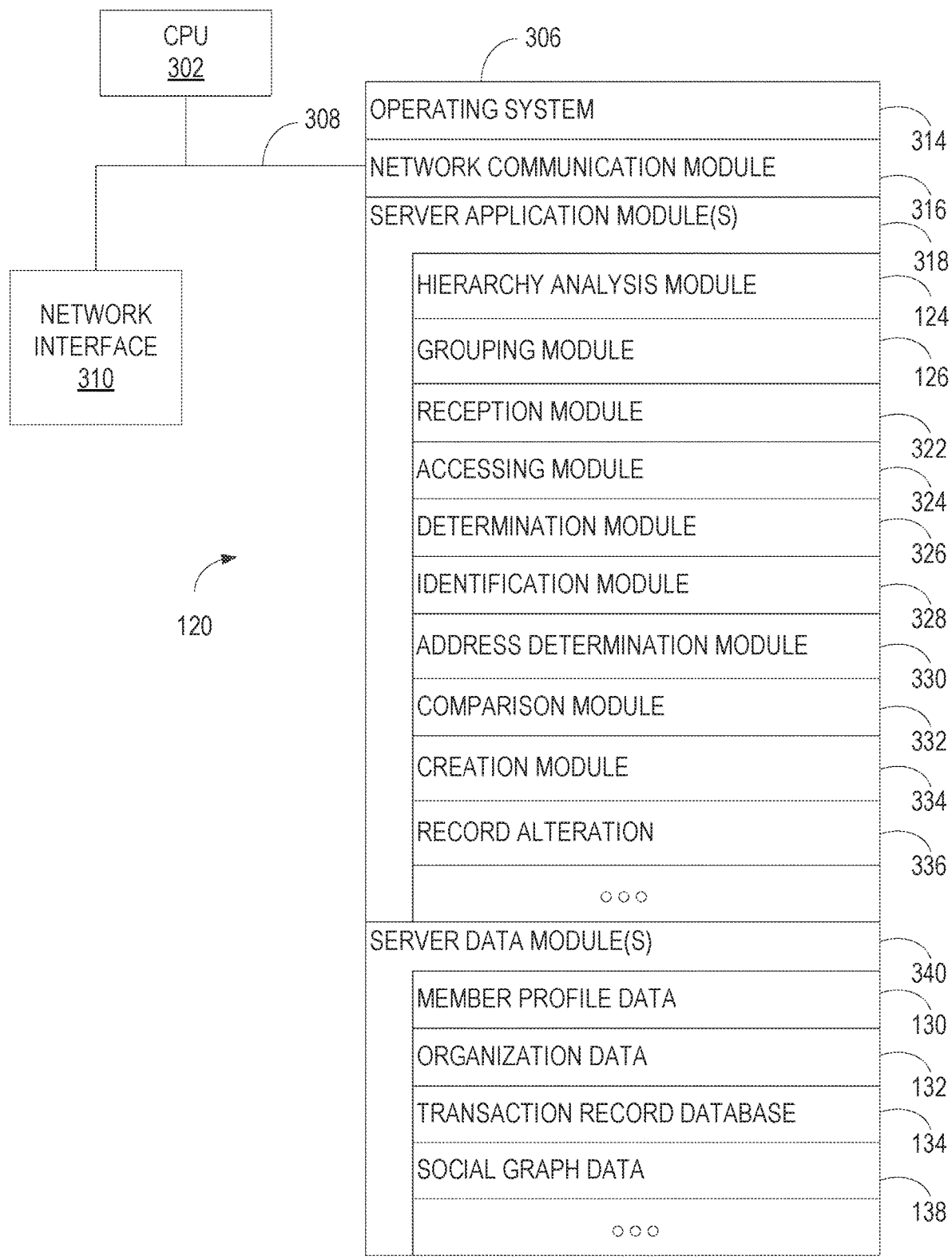
FIG. 3 is a block diagram illustrating a server system, in accordance with some example embodiments.

FIG. 3 is a block diagram further illustrating the server system 120, in accordance with some example embodiments. Thus, FIG. 3 is an example embodiment of the server system 120 in FIG. 1. The server system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprise(s) a non-transitory computer-readable storage medium. In some example embodiments, the memory 306, or the computer-readable storage medium of the memory 306, stores the following programs, modules, and data structures, or a subset thereof:
- an operating system 314 that includes procedures for handling various basic system services and for performing hardware-dependent tasks;
- a network communication module 316 that is used for connecting the server system 120 to other computers via the one or more network interfaces 310 (wired or wireless) and one or more communication networks 110, such as the Internet, other WANs, LANs, MANs, and so on;
- one or more server application modules 318 for performing the services offered by the server system 120, including but not limited to:
    - a hierarchy analysis module 124 for determining, for a given organization, the ultimate parent organization based on stored organization information in the organization data 132 including whether that organization has any related organizations;
    - a grouping module 126 for identifying sibling organizations (e.g., organizations that are part of the same hierarchical organization structure) from a plurality of member organizations and, for a given transaction, classifying the transaction based on the characteristics of the transaction into one of a plurality of transaction groups;
    - a reception module 322 for receiving transaction records from one or more members or organizations, wherein the transaction records describe a particular transaction initiated by an first organization;
    - an accessing module 324 for accessing data describing an organization and any information associated with the organization including the organization type, a list of members associated with the organization, the organization location, any associated organizations, and so on;
    - a determination module 326 for determining whether a particular organization is a subsidiary or sub-organization of another organization based on information stored in the particular organization's organization record;
    - an identification module 328 for identifying, for a particular organization, an ultimate parent organization;
    - an address determination module 330 for determining an address source for a particular organization, wherein the address source is a home address for an organization, a billing address for the organization, or the location at which the organization is registered;
    - a comparison module 332 for comparing the ultimate parent and source address for a first organization with those of a second organization to determine whether the first organization and the second organization are sibling organizations;

a creation module 334 for creating a third transaction record that includes both a first transaction record and a second transaction record if the comparison module 332 determines that the organization associated with the first transaction is a sibling organization to the organization associated with the second transaction; and a record alteration module 336 for updating a transaction record to list a parent organization rather than the original child organization; and server data module(s) 340, holding data related to the server system 120, including but not limited to:

member profile data 130, including both data provided by the member, who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on the member's activity, social graph data 138, overall trend data for the server system 120, and so on;

organization data 132 including data describing each member organization, details about the organization, and instances in which a member accesses an educational content item stored in the transaction record database 134;

a transaction record database 134 including a list of transactions that have been performed or requested for the server system 120; and social graph data 138 including data that represents members of the server system 120 and the social connections between them.

Figure 4:
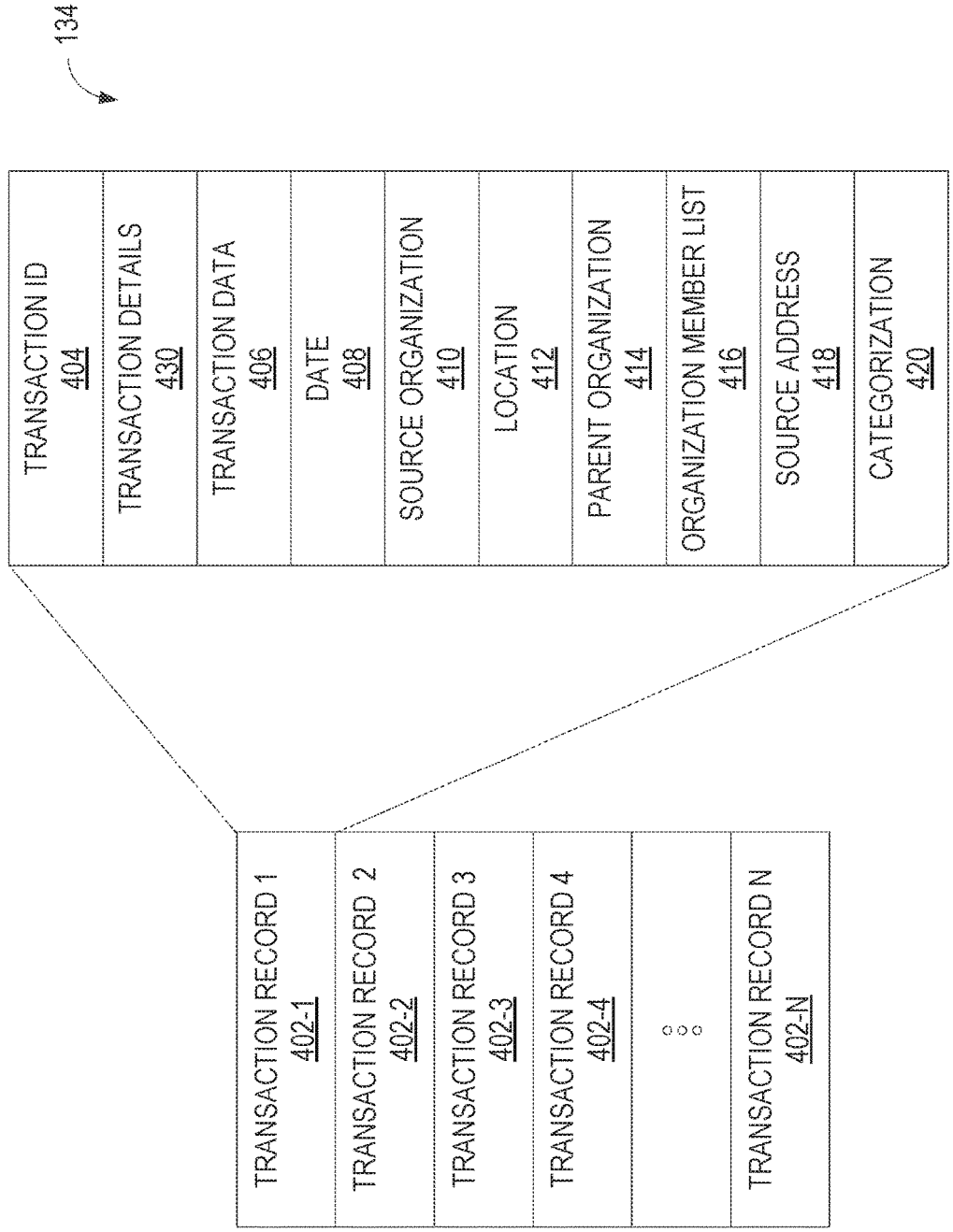
FIG. 4 is a block diagram of an exemplary data structure for a transaction record database for storing transaction records, in accordance with some example embodiments.

FIG. 4 is a block diagram of an exemplary data structure for the transaction record database 134 for storing transaction records, in accordance with some example embodiments. In accordance with some example embodiments, the transaction record database 134 includes a plurality of transaction records 402-1 to 402-N, each of which corresponds to a member of the server system 120.

In some example embodiments, a transaction record 402 stores a unique transaction ID 404 for the transaction record 402, one or more transaction details 430 (e.g., the type of transaction; what the transaction comprised; what the cost, if any, was; and so on), transaction data 406, a date 408 (and possible time) of the transaction, a source organization 410 (e.g., the organization that requested the transaction), a location 412 of the source organization, a parent organization 414 (e.g., the direct parent, if any) of the source organization, an organization member list 416, a source address 418 (e.g., the registered address or the billing address), and a categorization 420 of the transaction into one of a plurality of categories.

FIG. 5A is a depiction of a table that shows the results of comparing multiple account records with the goal of finding accounts that have the same ultimate parent, in accordance with an example embodiment. Thus, each row includes a first account record 502 (each account displaying a letter as an account identifier 504 to 508), a second account record 510 (each account displaying a letter as an account identifier 504, 506, and 514), and an ultimate parent 518 for the accounts in the corresponding row.

It should be noted that each account is associated with an organization or section of an organization. For example, in some example embodiments, a company has one central account through which they conduct business. However, some organizations may choose to have different divisions or offices have different accounts that focus on using the server system in a manner that is suited to their specific needs. Thus, each account is associated with a specific person (in which case there would be no parent account), with a specific organization, or with a section or division of an organization.

In some example embodiments, the first row lists account A 504 and account B 506, both of which have an ultimate parent 518 of Z 520. It should be noted that this table represents a series of accounts that are determined to have the same parent account. In other example embodiments, a similar table could list accounts that are compared but do not have the same ultimate parent and are thus determined to not be sibling accounts.

The second row lists account B 506 and account C 514, again with ultimate parent 518 of Z 520. The third row lists account D 508 and account A 504 with the ultimate parent 518 of Z 520. Thus, the table lists a group of accounts that have the same ultimate parent are and thus good candidates to be sibling accounts (e.g., the organizations that the accounts represent are connected by having the same parent organization).

Figure 5B:
FIG. 5B is a depiction of a table that shows the results of altering tables to make interaction aggregation more efficient by replacing account IDs for sibling accounts with the minimum account number for the group of sibling accounts, in accordance with an example embodiment.

FIG. 5B is a depiction of a table that shows the results of altering tables to make transaction aggregation more efficient by replacing account IDs for sibling accounts with the minimum account number for the group of sibling accounts, in accordance with an example embodiment.

In this example, the table is used to compare the source address for each account with the source address for the first account (e.g., in this case account A). Any account that has the same ultimate parent (as was determined in FIG. 5A) and the same source address as the first account is determined to be a sibling account with the first account.

In some example embodiments, the server system (e.g., the server system 120 in FIG. 1) also determines a minimum account 526 for a group of sibling accounts which acts as a temporary placeholder account to represent the entire group of sibling accounts that can be aggregated. In this way, a table or database (e.g., a SQL table) can be altered to list the minimum account 526 in place of the sibling account identifiers, and then the transactions can be aggregated without any special additional aggregation rules.

For example, in the case represented in FIG. 5B, the accounts A 504, B 506, and C 514 are determined to be sibling accounts based on their ultimate parent and their source address. However, both account D 508 and account Z 520 are determined to have a different source address and are therefore not considered to be full sibling accounts.

Once the group of full sibling accounts is determined (in this case, accounts A 504, B 506, and C 514), a minimum account is determined. By choosing the account with the lowest account ID, searching and sorting the accounts is made simpler. In other example embodiments, another method of choosing a temporary representative account can be used.

The table on the left in FIG. 5B represents the list of accounts as originally stored, where the five accounts A 504, B 506, C 514, D 508, and Z 520 are represented as distinct entities. By replacing the account IDs of accounts that are siblings with a common representative account (e.g., the minimum account 526), the table on the right more accurately represents which organizations are conducting which transactions.

Thus, the table on the right has replaced the instances of accounts A 504, B 506, and C 514 with the account ID for account A 504. Thus, in the right table, only account D 508 and account Z 520 are left unchanged. When an aggregation protocol is run on the transactions represented in the right table, the transactions represented in the first row and the second row will be aggregated into a single transaction, while the transactions in the third row will be left unaggregated.

Figure 6:
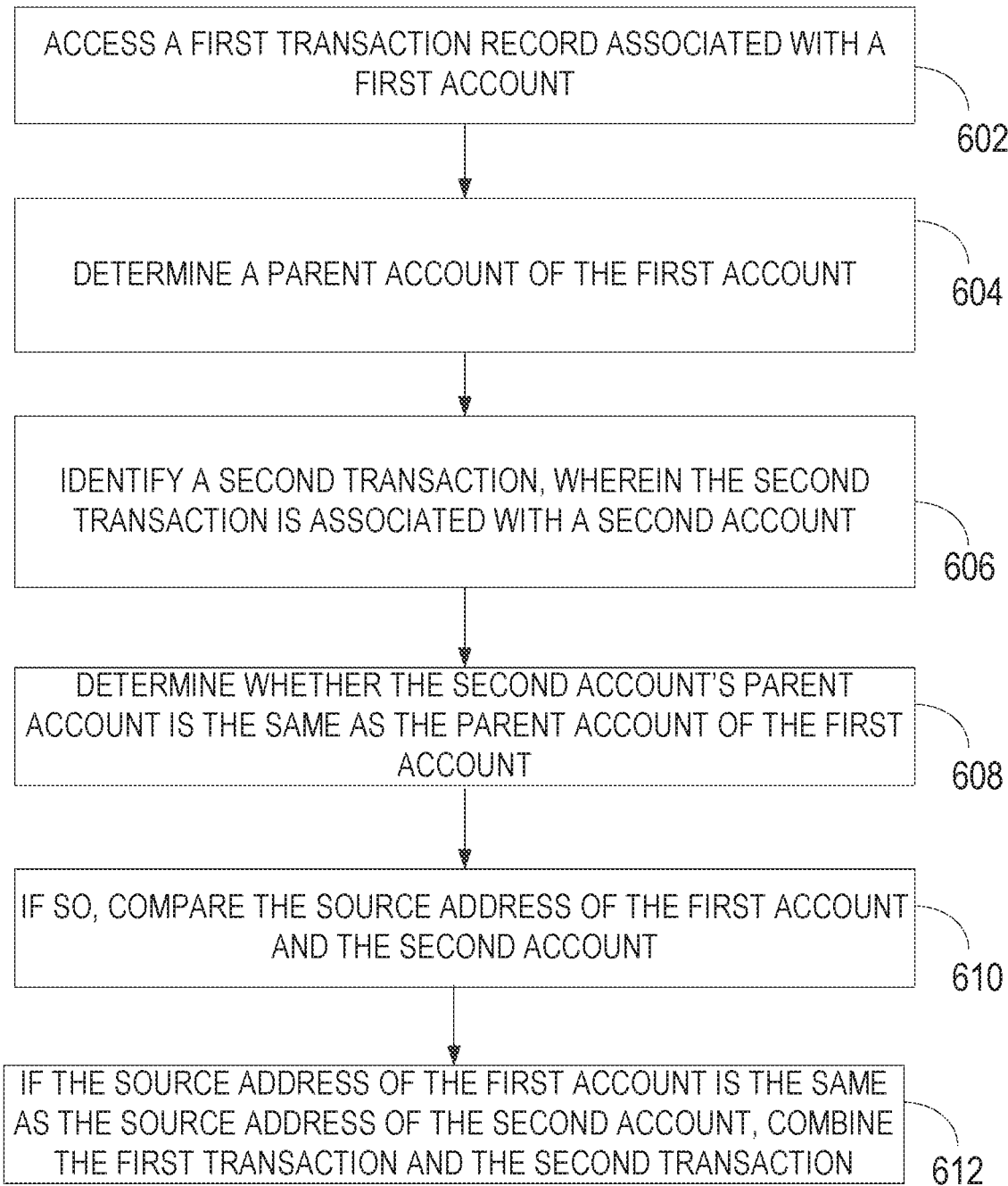
FIG. 6 is a flow diagram illustrating a method, in accordance with some example embodiments, for grouping transactions at a server system between sibling accounts that are not currently noted as sibling accounts.

FIG. 6 is a flow diagram illustrating a method, in accordance with some example embodiments, for grouping transactions at a server system between sibling accounts that are not currently noted as sibling accounts. Each of the operations shown in FIG. 6 may correspond to instructions stored in a computer memory or computer-readable storage medium. In some embodiments, the method described in FIG. 6 is performed by a server system (e.g., server system 120 in FIG. 1). However, the method described can also be performed by any other suitable configuration of electronic hardware.

In some embodiments, the method is performed by a server system (e.g., server system 120 in FIG. 1) including one or more processors and memory storing one or more programs for execution by the one or more processors.

In some example embodiments, the server system (e.g., the server system 120 in FIG. 1) accesses (602) a first transaction record associated with a first account. In some example embodiments, the transaction record includes the details of a transaction between a first organization (e.g., the organization that registered the first account) and the server system (e.g., the server system 120 in FIG. 1). In some example embodiments, the transaction is a sale or purchase of goods or services. For example, a corporation can store data with a cloud based server system (e.g., the server system 120 in FIG. 1). In other examples, a server system (e.g., the server system 120 in FIG. 1) provides web hosting services to a member.

In some example embodiments, the first transaction record is stored at a database at the server system (e.g., the server system 120 in FIG. 1). In other example embodiments, the server system (e.g., the server system 120 in FIG. 1) receives the first transaction record from the member who is initiating the transaction described in the first transaction record.

In some example embodiments, the server system (e.g., the server system 120 in FIG. 1) determines (604) a parent account of the first account. For example, a transaction record stores information including the account with which it is associated and the transaction to be conducted. Using that information, the server system (e.g., the server system 120 in FIG. 1) can retrieve the account record for the first account associated with the transaction.

The account record can list related accounts, including any parent accounts. Once a parent account is identified, the server system (e.g., the server system 120 in FIG. 1) can determine whether that parent account has a parent account itself. In this way, the server system (e.g., the server system 120 in FIG. 1) can follow a hierarchical structure of accounts to determine an ultimate parent account for a given account.

In some example embodiments, the server system (e.g., the server system 120 in FIG. 1) identifies (606) a second transaction (with an accompanying transaction record) wherein the second transaction is associated with a second account. In some example embodiments, the second transaction record is identified based on details of the transaction, including, but not limited to, the time the transaction is to be executed, the type of transaction, the location the transaction is associated with, and so on.

In some example embodiments, the server system (e.g., the server system 120 in FIG. 1) determines (608) whether the second account's parent account is the same parent account as the parent account of the first account. For example, the server system (e.g., the server system 120 in FIG. 1) determines the ultimate parent account for both the first account and the second account. Once the ultimate parent has been determined for each, the two parent accounts are compared (e.g., by account ID). If the two parent accounts are determined to be the same, the first account and the second account are determined to be sibling accounts.

In accordance with a determination that the first account and the second account have the same parent (or ultimate parent) account, the server system (e.g., the server system 120 in FIG. 1) compares (610) the source address of the first account to the source address of the second account. (A source address can be a billing address, a shipping address, a registered address, and so on).

In accordance with a determination that the source address of the first account and the source address of the second account are the same, the server system (e.g., the server system 120 in FIG. 1) combines (612) the first transaction and the second transaction into a third transaction that includes both the first transaction and the second transaction. The server system (e.g., the server system 120 in FIG. 1) modifies the database to create a third transaction record that includes the details of both the first transaction and the second transaction. In other embodiments, the server system (e.g., the server system 120 in FIG. 1) modifies the records of the first transaction and the second transaction without creating a third transaction record.

Figure 7A:
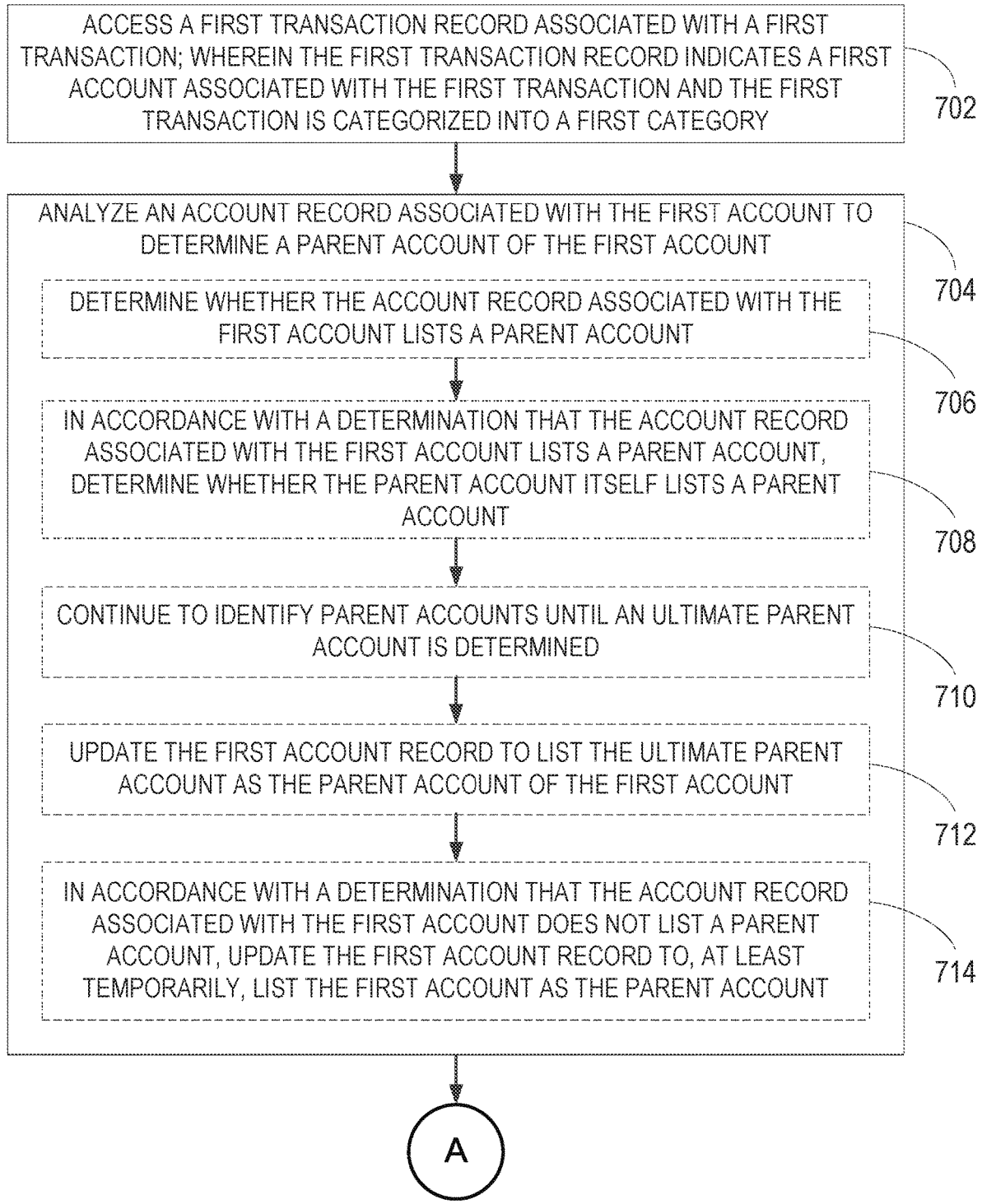
FIGS. 7A-7E are flow diagrams illustrating a method, in accordance with some example embodiments, for grouping transactions at a server system (e.g., the server system in FIG. 1) between sibling accounts that are not currently noted as sibling accounts.

FIG. 7A is a flow diagram illustrating a method, in accordance with some example embodiments, for grouping transactions at a server system (e.g., the server system 120 in FIG. 1) between sibling accounts that are not currently noted as sibling accounts. Each of the operations shown in FIG. 7A may correspond to instructions stored in a computer memory or computer-readable storage medium. Optional operations are indicated by dashed lines (e.g., boxes with dashed-line borders). In some embodiments, the method described in FIG. 7A is performed by the server system (e.g., server system 120 in FIG. 1). However, the method described can also be performed by any other suitable configuration of electronic hardware.

In some embodiments, the method is performed by a server system (e.g., server system 120 in FIG. 1) including one or more processors and memory storing one or more programs for execution by the one or more processors.

In some example embodiments, the server system (e.g., the server system 120 in FIG. 1) accesses (702) a first transaction record associated with a first transaction, wherein the first transaction record indicates a first account associated with the first transaction and the first transaction is categorized into a first category. In some example embodiments, the server system (e.g., the server system 120 in FIG. 1) stores a plurality of transaction records in a database at the server system (e.g., the server system 120 in FIG. 1). When a new transaction is requested by a member, the server system (e.g., the server system 120 in FIG. 1) creates a transaction record for the transaction that includes details of the transaction, such as date initiated, transaction date, associated account, transaction type, transaction amount, and any details or data needed for the transaction. For example, if a transaction is a purchase of advertising space or time, the transaction record could include the details as to when and where the advertising is to be shown, and what content is being used as an advertisement (e.g., a link to the content can be included).

In some example embodiments, each transaction type can be grouped into a plurality of categories. In some example embodiments, the categories are based on the size of the transaction (e.g., such that larger transactions receive a reduced rate). In other example embodiments, the categories are based on the organization requesting the transaction (e.g., smaller or private organizations may receive a different rate or different options than larger or public corporations). In other example embodiments, categories are based on the laws of a country of origin for the transaction. For example, a given country may have a law that require, that storage of data that is primarily sourced (e.g., over 80 percent) from the given country include one or more steps to preserve member privacy. Thus, transactions are categorized by their country of origin.

In some example embodiments, each account is associated with a particular member organization or group on the server system (e.g., the server system 120 in FIG. 1). For example, an organization registers with the server system (e.g., the server system 120 in FIG. 1) so as to access the cloud computing services offered by the server system (e.g., the server system 120 in FIG. 1). During the registration, the server system (e.g., the server system 120 in FIG. 1) creates an account record for the organization. Any transaction that the organization initiates will list the account number associated with the organization as the source account.

In some example embodiments, the server system (e.g., the server system 120 in FIG. 1) analyzes (704) an account record associated with the first account to determine a parent account of the first account. In some example embodiments, to do so, the server system (e.g., the server system 120 in FIG. 1) first determines (706) whether the account record associated with the first account lists a parent account. In some example embodiments, the account record includes a listing of any related accounts, including a parent account.

The server system (e.g., the server system 120 in FIG. 1) determines whether a given account has a parent account by accessing the parent account field in the account record. If the parent account field is blank, the server system (e.g., the server system 120 in FIG. 1) determines that the account has no parent account. If the parent account field lists an account, the server system (e.g., the server system 120 in FIG. 1) determines the listed account as the parent account.

In other example embodiments, the server system (e.g., the server system 120 in FIG. 1) determines a parent account from a third party source. For example, publicly accessible governmental registration documents may list a parent company. In other example embodiments, the server system (e.g., the server system 120 in FIG. 1) can infer a parent account based on information stored concerning both the given account and any potential parent accounts.

In accordance with a determination that the account record associated with the first account lists a parent account, the server system (e.g., the server system 120 in FIG. 1) determines (708) whether the parent account itself lists a parent account. For example, if, during an analysis of account A, the server system (e.g., the server system 120 in FIG. 1) determines that the parent account of account A is account B, the server system (e.g., the server system 120 in FIG. 1) then determines whether account B has a parent account. In this way, the server system (e.g., the server system 120 in FIG. 1) can navigate a complex account hierarchy. For example, if each account represents an organization, an entire group of organizations could have the same parent organization of which they are subsidiaries. Indeed, a hierarchy with multiple levels of subsidiaries could be navigated by the server system (e.g., the server system 120 in FIG. 1) in the process of determining which organizations are actually connected to each other.

In some example embodiments, the server system (e.g., the server system 120 in FIG. 1) continues (710) to identify parent accounts until an ultimate parent account is determined. Thus, continuing the example above, account B lists account C as the parent account, and the server system (e.g., the server system 120 in FIG. 1) determines whether account C has a parent account. The server system (e.g., the server system 120 in FIG. 1) continues to determine, for each new parent account, whether that account itself has a parent until an account without a parent account is determined. This account is the ultimate parent for this account hierarchy.

In some example embodiments, the server system (e.g., the server system 120 in FIG. 1) updates (712) the first account record to list the ultimate parent account as the parent account of the first account. For example, if account A has an ultimate parent account of account F, the account record for account A will be changed, at least temporarily, to list account F as the parent. In this way, any account that is a subsidiary account to account F will list account F as the parent account. Then, when two accounts are compared, the server system (e.g., the server system 120 in FIG. 1) can determine whether the two accounts are sibling accounts (e.g., they are part of the same hierarchy of accounts) by comparing their parent accounts.

In accordance with a determination that the account record associated with the first account does not list a parent account, the server system (e.g., the server system 120 in FIG. 1) updates (714) the first account record to, at least temporarily, list the first account as the parent account. In this way, if a given account is the top-level account in an account hierarchy, it will be matched correctly with its subsidiaries (which will list it as the ultimate parent).

Figure 7B:
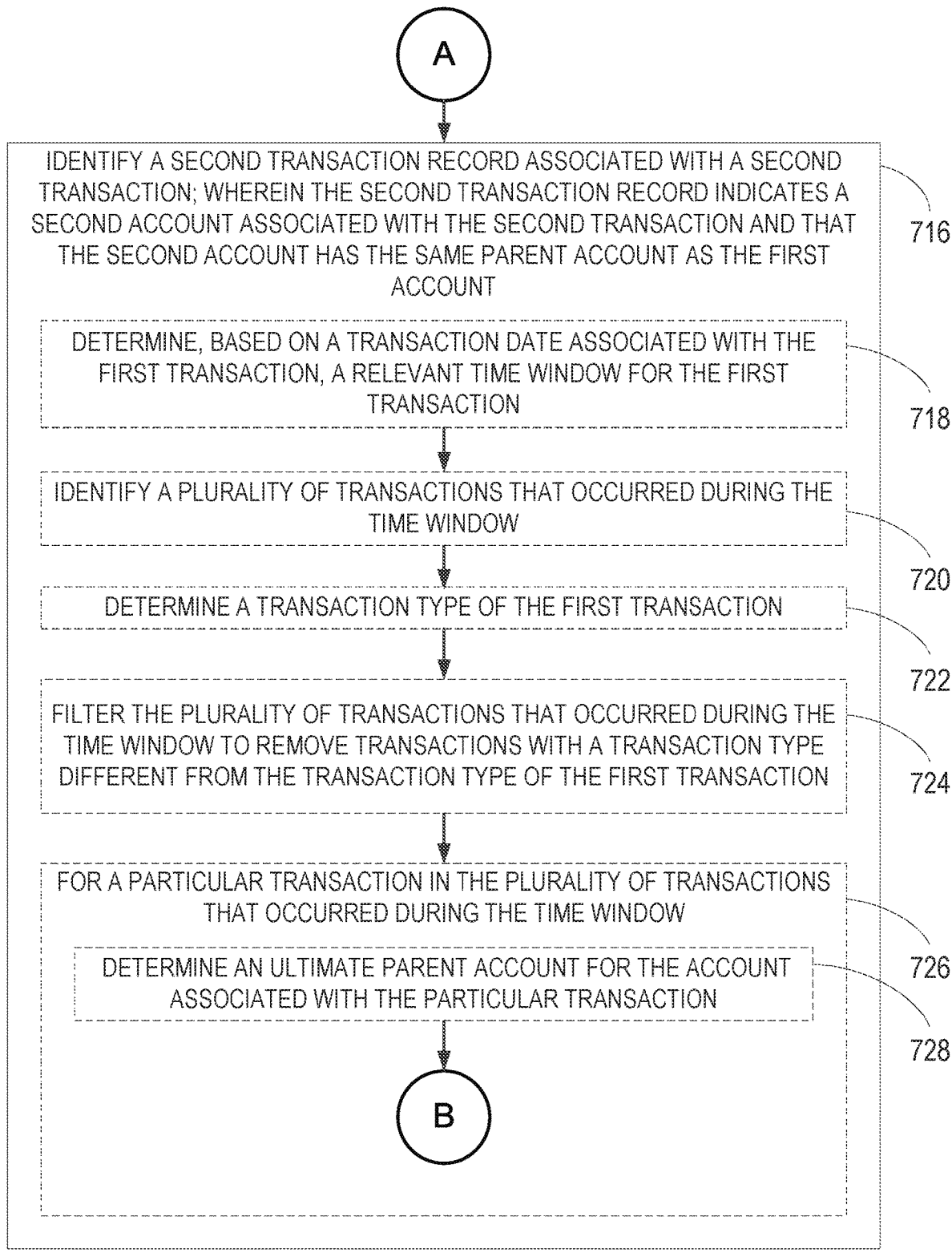

FIG. 7B is a flow diagram illustrating a method, in accordance with some example embodiments, for grouping transactions at a server system (e.g., the server system 120 in FIG. 1) between sibling accounts that are not currently noted as sibling accounts. Each of the operations shown in FIG. 7B may correspond to instructions stored in a computer memory or computer-readable storage medium. Optional operations are indicated by dashed lines (e.g., boxes with dashed-line borders). In some embodiments, the method described in FIG. 7B is performed by the server system (e.g., server system 120 in FIG. 1). However, the method described can also be performed by any other suitable configuration of electronic hardware. The method of FIG. 7B is also a continuation of the method shown in FIG. 7A.

In some embodiments, the method is performed by a server system (e.g., server system 120 in FIG. 1) including one or more processors and memory storing one or more programs for execution by the one or more processors.

In some example embodiments, the server system (e.g., the server system 120 in FIG. 1) identifies (716) a second transaction record associated with a second transaction, wherein the second transaction record indicates a second account associated with the second transaction and that the second account has the same parent account as the first account.

In some example embodiments, identifying a second transaction record associated with a second transaction includes the server system (e.g., the server system 120 in FIG. 1) determining (718), based on a transaction date associated with the first transaction, a relevant time window for the first transaction. For example, for a transaction that is due to be closed on May 1, transactions that are closed more than a month before or after that day may not be considered. In this way, only transactions that are close in time are considered for possible aggregation. In some example embodiments, the size of the time window is predetermined (e.g., one week, one month, or another specified time window). In other example embodiments, the size for the time window is determined based on the nature of the transaction and the details involved.

Once a time window is identified, the server system (e.g., the server system 120 in FIG. 1) identifies (720) a plurality of transactions that occurred during the time window. Thus, the server system (e.g., the server system 120 in FIG. 1) searches the database of transactions to identify any transaction that occurs during the relevant time window for the first transaction.

In some example embodiments, the server system (e.g., the server system 120 in FIG. 1) determines (722) a transaction type of the first transaction. For example, the first transaction is determined to be an advertising purchase transaction. In another example, the first transaction is determined to be a data storage transaction.

The server system (e.g., the server system 120 in FIG. 1) filters (724) the plurality of transactions that occurred during the time window to remove transactions with a transaction type different from the transaction type of the first transaction. In this way, only transactions that are similar to the first transaction in time and in type will be considered for potential aggregation.

For a particular transaction in the plurality of transactions that occurred during the time window (726), the server system (e.g., the server system 120 in FIG. 1) determines an account associated with the particular transaction. For example, using the particular transaction record, the server system (e.g., the server system 120 in FIG. 1) retrieves the associated account from a database at the server system (e.g., the server system 120 in FIG. 1).

The server system (e.g., the server system 120 in FIG. 1) determines (728) an ultimate parent account for the account associated with the particular transaction. As noted above, determining an ultimate parent includes finding each successive parent account until a parent account without its own parent is reached.

Figure 7C:
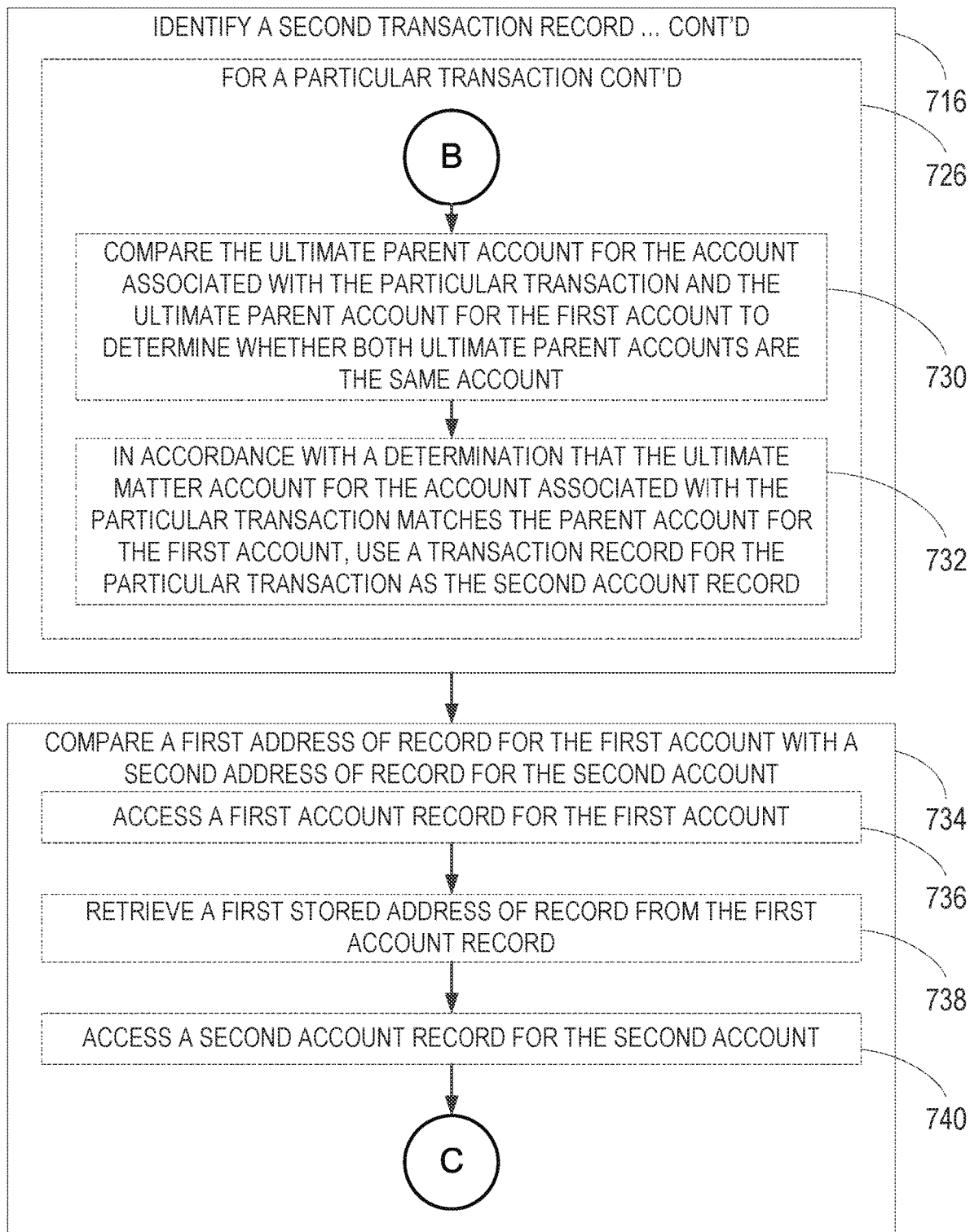

FIG. 7C is a flow diagram illustrating a method, in accordance with some example embodiments, for grouping transactions at a server system (e.g., the server system 120 in FIG. 1) between sibling accounts that are not currently noted as sibling accounts. Each of the operations shown in FIG. 7C may correspond to instructions stored in a computer memory or computer-readable storage medium. Optional operations are indicated by dashed lines (e.g., boxes with dashed-line borders). In some embodiments, the method described in FIG. 7C is performed by the server system (e.g., server system 120 in FIG. 1). However, the method described can also be performed by any other suitable configuration of electronic hardware. The method of FIG. 7C is also a continuation of the method shown in FIGS. 7A-7B.

In some embodiments, the method is performed by a server system (e.g., server system 120 in FIG. 1) including one or more processors and memory storing one or more programs for execution by the one or more processors.

In some example embodiments, the server system (e.g., the server system 120 in FIG. 1) compares (730) the ultimate parent account for the account associated with the particular transaction and the parent account for the first account to determine whether both ultimate parent accounts are the same account.

In accordance with a determination that the ultimate parent account for the account associated with the particular transaction matches the parent account for the first account, the server system (e.g., the server system 120 in FIG. 1) uses (732) a transaction record for the particular transaction as the second transaction record.

In some example embodiments, the server system (e.g., the server system 120 in FIG. 1) compares (734) a first address of record for the first account with a second address of record for the second account. To do so, the server system (e.g., the server system 120 in FIG. 1) accesses (736) a first account record for the first account. Using the first account record, the server system (e.g., the server system 120 in FIG. 1) retrieves (738) a first stored address of record from the first account record.

In some example embodiments, the server system (e.g., the server system 120 in FIG. 1) accesses (740) a second account record for the second account. As noted above, the account records are stored in a database at the server system (e.g., the server system 120 in FIG. 1).

Figure 7D:
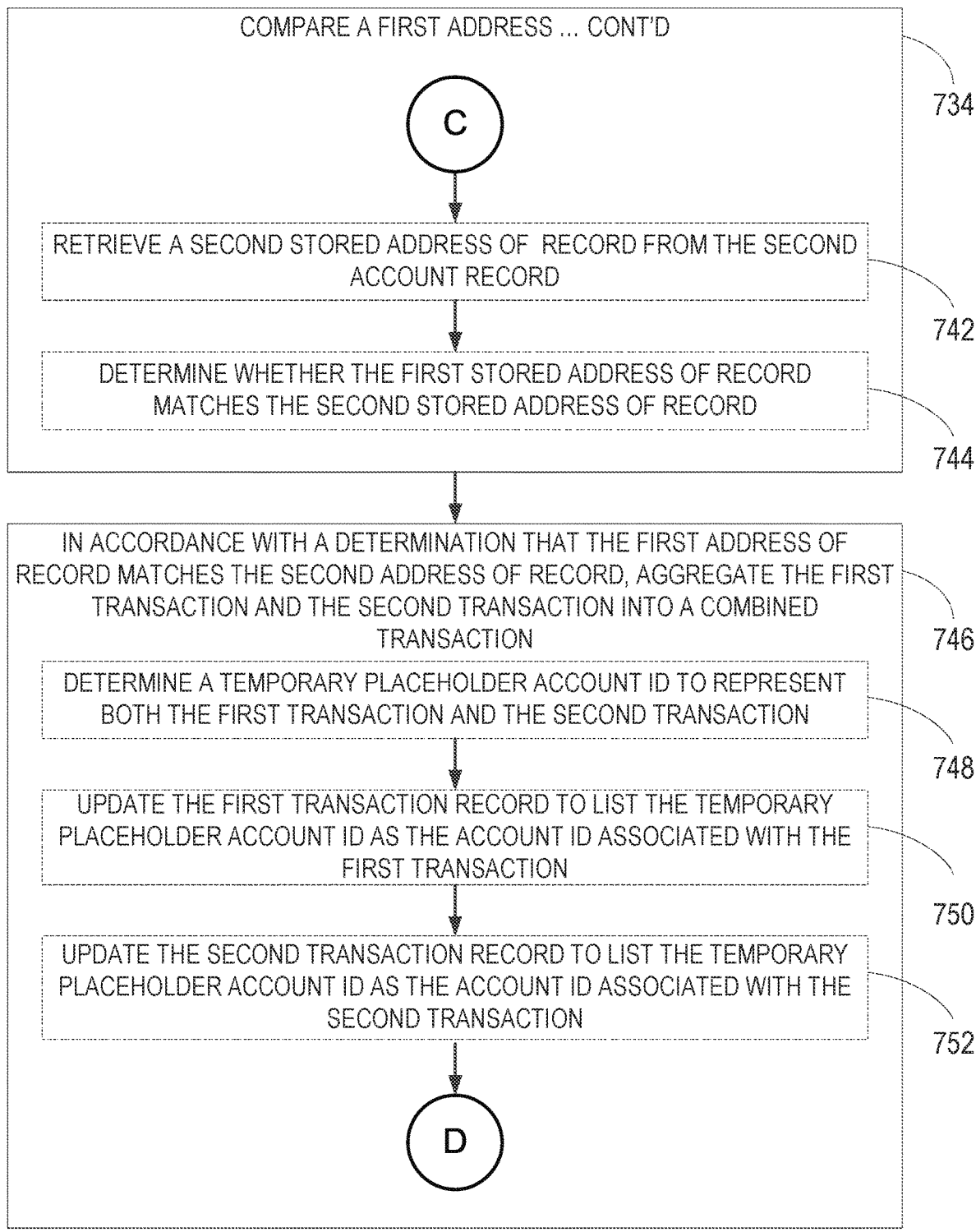

FIG. 7D is a flow diagram illustrating a method, in accordance with some example embodiments, for grouping transactions at a server system (e.g., the server system 120 in FIG. 1) between sibling accounts that are not currently noted as sibling accounts. Each of the operations shown in FIG. 7D may correspond to instructions stored in a computer memory or computer-readable storage medium. Optional operations are indicated by dashed lines (e.g., boxes with dashed-line borders). In some embodiments, the method described in FIG. 7D is performed by the server system (e.g., server system 120 in FIG. 1). However, the method described can also be performed by any other suitable configuration of electronic hardware. The method of FIG. 7D is also a continuation of the method shown in FIGS. 7A-7C.

In some embodiments, the method is performed by a server system (e.g., server system 120 in FIG. 1) including one or more processors and memory storing one or more programs for execution by the one or more processors.

In some example embodiments, the server system (e.g., the server system 120 in FIG. 1) retrieves (742) a second stored address of record from the second account record. The server system (e.g., the server system 120 in FIG. 1) determines (744) whether the first stored address of record matches the second stored address of record. In some example embodiments, an address of record is one of a billing address, a registration address, a shipping address, or another address associated with an account.

In accordance with a determination that the first address of record matches the second address of record, the server system (e.g., the server system 120 in FIG. 1) aggregates (746) the first transaction and the second transaction into a combined transaction.

In some example embodiments, aggregating the first transaction and the second transaction into a combined transaction includes the server system (e.g., the server system 120 in FIG. 1) determining (748) a temporary placeholder account ID to represent both the first transaction and the second transaction. In some example embodiments, the temporary placeholder account ID is the smaller of the account ID of the first account and the account ID of the second account. In other example embodiments, the temporary placeholder account ID is a newly generated account ID.

In some example embodiments, the server system (e.g., the server system 120 in FIG. 1) updates (750) the first transaction record to list the temporary placeholder account ID as the account ID associated with the first transaction. In some example embodiments, the transaction records are stored in a relational database management system (RDBMS) and the server system (e.g., the server system 120 in FIG. 1) uses a structured query language to make changes.

The server system (e.g., the server system 120 in FIG. 1) also updates (752) the second transaction record to list the temporary placeholder account ID as the account ID associated with the second transaction. Thus, both the first transaction record and the second transaction record now list the same source account.

Figure 7E:
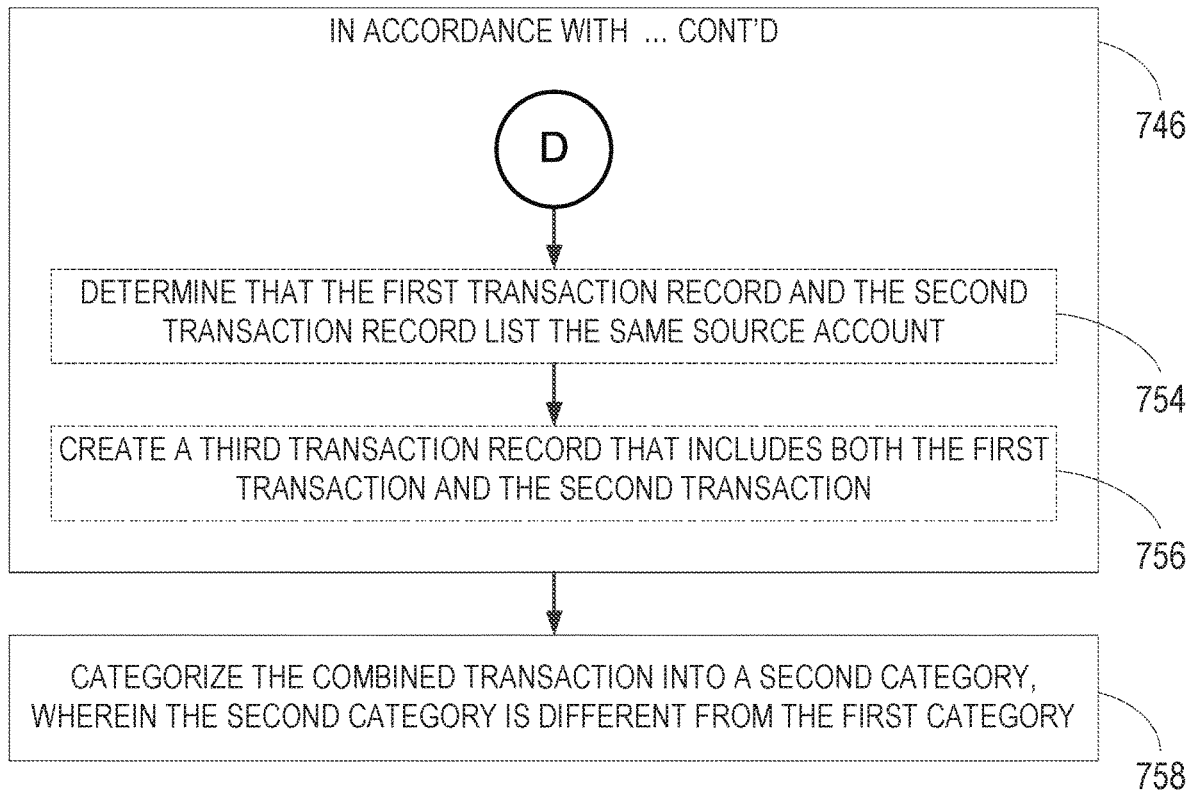

FIG. 7E is a flow diagram illustrating a method, in accordance with some example embodiments, for grouping transactions at a server system (e.g., the server system 120 in FIG. 1) between sibling accounts that are not currently noted as sibling accounts. Each of the operations shown in FIG. 7E may correspond to instructions stored in a computer memory or computer-readable storage medium. Optional operations are indicated by dashed lines (e.g., boxes with dashed-line borders). In some embodiments, the method described in FIG. 7E is performed by the server system (e.g., server system 120 in FIG. 1). However, the method described can also be performed by any other suitable configuration of electronic hardware. The method of FIG. 7E is also a continuation of the method shown in FIGS. 7A-7D.

In some embodiments, the method is performed by a server system (e.g., server system 120 in FIG. 1) including one or more processors and memory storing one or more programs for execution by the one or more processors.

In some example embodiments, the server system (e.g., the server system 120 in FIG. 1) determines (754) that the first transaction record and the second transaction record list the same source account. In some example embodiments, this determination is made as part of a routine analysis of the transaction records. In other example embodiments, the server system (e.g., the server system 120 in FIG. 1) schedules an aggregation analysis after replacing the account IDs for the first and second transactions with the temporary placeholder account ID.

In response to determining that the first transaction record and the second transaction record list the same source account, the server system (e.g., the server system 120 in FIG. 1) creates (756) a third transaction record that includes both the first transaction and the second transaction. In some example embodiments, the server system (e.g., the server system 120 in FIG. 1) adds a third transaction record listing the contents of the first transaction record and the second transaction record. In some example embodiments, the first transaction record and the second transaction record are removed from the transaction record database.

In some example embodiments, the server system (e.g., the server system 120 in FIG. 1) categorizes (758) the combined transaction into a second category, wherein the second category is different from the first category. For example, the combined transaction includes a second number of purchases and the transaction is eligible for a discounted pricing tier. In other example embodiments, the first transaction was associated with a small subsidiary of a larger company and when combined with the second transaction is determined to be sourced from the larger company, for whom a different pricing rate and service options are available.

In some example embodiments, the first transaction included data that was at least 50% from country A and thus was regulated by the rules and guidelines of country A. The combined transaction had data that was less than 50% from Country A and no longer is regulated by laws or rules of Country A.

In this way transactions are more accurately categorized by putting them in the context of the associated transactions.

Software Architecture

Figure 8:
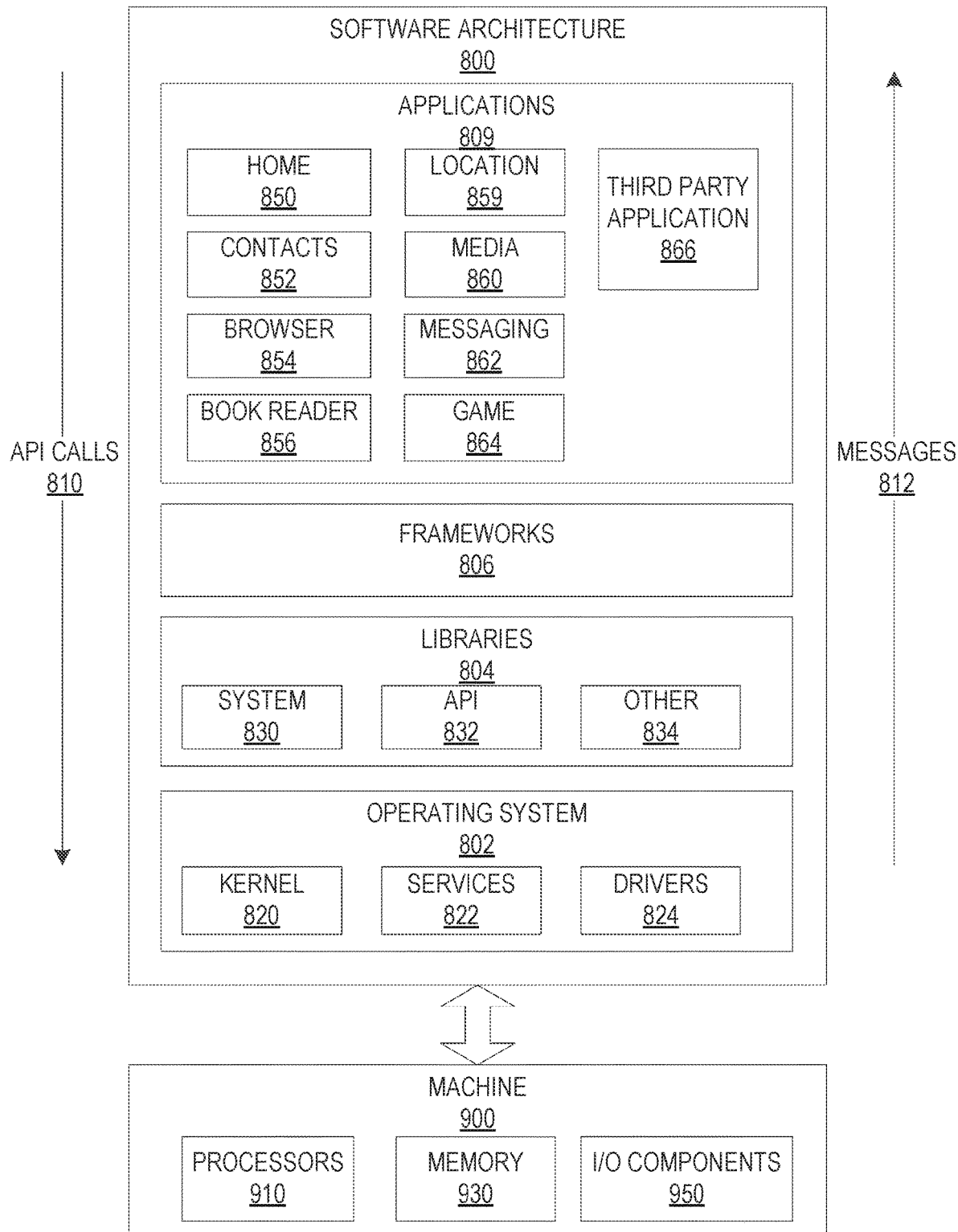
FIG. 8 is a block diagram illustrating an architecture of software, which may be installed on any one or more devices, in accordance with some example embodiments.

FIG. 8 is a block diagram illustrating an architecture of software 800, which may be installed on any one or more of the devices of FIG. 1. FIG. 8 is merely a non-limiting example of an architecture of software 800 and it will be appreciated that many other architectures may be implemented to facilitate the functionality described herein. The software 800 may be executing on hardware such as a machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 809. Operationally, the applications 809 may invoke API calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 809. The libraries 804 may include system libraries 830 (e.g., C standard library) that may provide functions such as memory allocation functions, string manipulation functions, mathematic functions, and the like. In addition, the libraries 804 may include API libraries 832 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 809.

The frameworks 806 may provide a high-level common infrastructure that may be utilized by the applications 809. For example, the frameworks 806 may provide various graphical user interface (GUI) functions, high-level resource management, high-level location services, and so forth. The frameworks 806 may provide a broad spectrum of other APIs that may be utilized by the applications 809, some of which may be specific to a particular operating system 802 or platform.

The applications 809 include a home application 850, a contacts application 852, a browser application 854, a book reader application 856, a location application 859, a media application 860, a messaging application 862, a game application 864, and a broad assortment of other applications such as a third party application 866. In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 810 provided by the mobile operating system, such as the operating system 802, to facilitate functionality described herein.

Example Machine Architecture and Machine-Readable Medium

Figure 9:
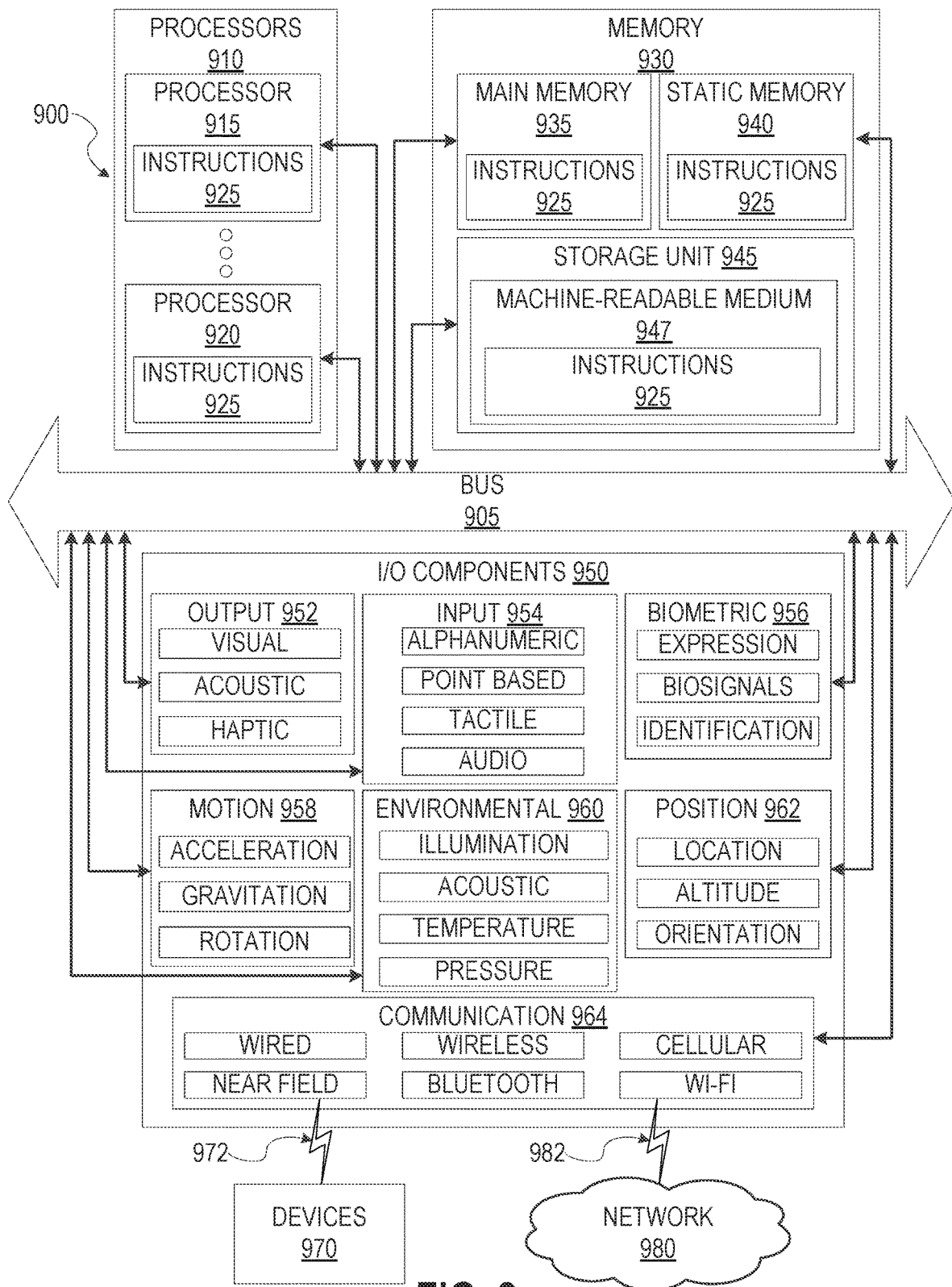
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software 800, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 915 and a processor 920, which may execute the instructions 925. The term "processor" is intended to include multi-core processors 910 that may comprise two or more independent processors 915, 920 (also referred to as "cores") that may execute the instructions 925 contemporaneously. Although FIG. 9 shows multiple processors 910, the machine 900 may include a single processor 910 with a single core, a single processor 910 with multiple cores (e.g., a multi-core processor), multiple processors 910 with a single core, multiple processors 910 with multiple cores, or any combination thereof.

The memory 930 may include a main memory 935, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 935, within the static memory 940, within at least one of the processors 910 (e.g., within the processor's cache memory), or any suitable combination thereof, during execution thereof by the machine 900. Accordingly, the main memory 935, the static memory 940, and the processors 910 may be considered machine-readable media 947.

As used herein, the term "memory" refers to a machine-readable medium 947 able to store data temporarily or permanently and may be taken to include, but not be limited to, random-access memory (RAM), read-only memory (ROM), buffer memory, flash memory, and cache memory. While the machine-readable medium 947 is shown, in an example embodiment, to be a single medium, the term "machine-readable medium" should be taken to include a single medium or multiple media (e.g., a centralized or distributed database, or associated caches and servers) able to store the instructions 925. The term "machine-readable medium" shall also be taken to include any medium, or combination of multiple media, that is capable of storing instructions (e.g., instructions 925) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 and/or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine 900 and/or any of a wide variety of peripheral devices (e.g., a peripheral device coupled via a USB).

Moreover, the communication components 964 may detect identifiers and/or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., HTTP). Similarly, the instructions 925 may be transmitted and/or received using a transmission medium via the coupling 972 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software 800.

Furthermore, the machine-readable medium 947 is non-transitory (in other words, not having any transitory signals) in that it does not embody a propagating signal. However, labeling the machine-readable medium 947 as "non-transitory" should not be construed to mean that the medium is incapable of movement; the medium should be considered as being transportable from one physical location to another. Additionally, since the machine-readable medium 947 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A computer-implemented method performed at a server system, using at least one computer processor, the method comprising:

accessing a first transaction record, the first transaction record listing a first account associated with a first transaction, the first transaction being categorized into a first category;

determining a parent account of the first account, the parent account being a non-educational organization that is the highest in a hierarchy of non-educational organizations that includes the first account, the determining being based on analyzing an account record associated with the first account;

identifying a second transaction record associated with a second account, the second account having the same parent account as the first account, the second account being included in the hierarchy of non-educational organizations;

comparing a first billing address of record for the first account to a second billing address of record for the second account;

in accordance with a determination that the first billing address of record matches the second billing address of record, aggregating the first transaction and a second transaction listed in the second transaction record into a combined transaction; and responsive to aggregating the first transaction and the second transaction listed in the second transaction record into the combined transaction, categorizing the combined transaction into a second category, the second category being different from the first category.

2. The method of claim 1, wherein analyzing the account record associated with the first account to determine the parent account of the first account further comprises:

determining whether the account record associated with the first account lists a parent account for the first account;

in accordance with a determination that the account record associated with the first account lists a parent account for the first account, determining whether an account record associated with the parent account for the first account lists a parent account; and continuing to identify parent accounts until an ultimate parent account is determined.

3. The method of claim 2, further comprising:

updating the account record associated with the first account to list the ultimate parent account as the parent account of the first account.

4. The method of claim 3, further comprising:

in accordance with a determination that the account record associated with the first account does not list a parent account, updating the account record associated with the first account to, at least temporarily, list the first account as the parent account.

5. The method of claim 1, wherein identifying the second transaction record associated with the second account further comprises:

determining, based on a transaction date associated with the first transaction, a relevant time window for the first transaction;

identifying a plurality of transactions that occurred during the time window; and for a particular transaction in the plurality of transactions that occurred during the time window:

determining an account associated with the particular transaction;

determining an ultimate parent account for the account associated with the particular transaction;

comparing the ultimate parent account for the account associated with the particular transaction to the parent account for the first account to determine whether both ultimate parent accounts are the same account; and in accordance with a determination that the ultimate parent account for the account associated with the particular transaction matches the parent account for the first account, using a transaction record for the particular transaction as the second transaction record.

6. The method of claim 5, further comprising:

determining a transaction type of the first transaction; and filtering the plurality of transactions that occurred during the time window to remove transactions with a transaction type different from the transaction type of the first transaction.

7. The method of claim 1, wherein comparing the first billing address of record for the first account to the second billing address of record for the second account further comprises:

accessing the first account record for the first account;

retrieving a first stored billing address of record from the first account record;

accessing a second billing account record for the second account;

retrieving a second stored billing address of record from the second account record; and determining whether the first stored billing address of record matches the second stored billing address of record.

8. The method of claim 1, wherein aggregating the first transaction and the second transaction into the combined transaction further comprises:

determining a temporary placeholder account identifier to represent both the first transaction and the second transaction.

9. The method of claim 8, wherein the temporary placeholder account identifier is the smaller of an account identifier of the first account and an account identifier of the second account.

10. The method of claim 8, further comprising:

updating the first transaction record to list the temporary placeholder account identifier as an account identifier associated with the first transaction; and updating the second transaction record to list the temporary placeholder account identifier as an account identifier associated with the second transaction.

11. The method of claim 10, further comprising:

determining that the first transaction record and the second transaction record list a same source account; and creating a third transaction record that includes both the first transaction and the second transaction.

12. A system comprising:

one or more hardware processors; and a non-transitory computer-readable medium for storing instructions that, when executed by the one or more hardware processors, cause the one or more hardware processors to perform operations comprising:

accessing a first transaction record, the first transaction record listing a first account associated with a first transaction, the first transaction being categorized into a first category;

determining a parent account of the first account, the parent account being a non-educational organization that is the highest in a hierarchy of non-educational organizations that includes the first account, the determining being based on analyzing an account record associated with the first account;

identifying a second transaction record associated with a second account, the second account having the same parent account as the first account, the second account being included in the hierarchy of non-educational organizations;

comparing a first billing address of record for the first account to a second billing address of record for the second account;

in accordance with a determination that the first billing address of record matches the second billing address of record, aggregating the first transaction and a second transaction listed in the second transaction record into a combined transaction; and responsive to aggregating the first transaction and the second transaction listed in the second transaction record into the combined transaction, categorizing the combined transaction into a second category, the second category being different from the first category.

13. The system of claim 12, wherein the operations for analyzing the account record associated with the first account to determine the parent account of the first account further comprise operations for:

determining whether the account record associated with the first account lists a parent account for the first account;

in accordance with a determination that the account record associated with the first account lists a parent account for the first account, determining whether an account record associated with the parent account for the first account lists a parent account; and continuing to identify parent accounts until an ultimate parent account is determined.

14. The system of claim 13, wherein the operations further comprise:

updating the account record associated with the first account to list the ultimate parent account as the parent account of the first account.

15. The system of claim 14, wherein the operations further comprise:

in accordance with a determination that the account record associated with the first account does not list a parent account, updating the account record associated with the first account to, at least temporarily, list the first account as the parent account.

16. The system of claim 12, wherein the operations for identifying the second transaction record associated with the second account further comprise operations for:

determining, based on a transaction date associated with the first transaction, a relevant time window for the first transaction;

identifying a plurality of transactions that occurred during the time window; and for a particular transaction in the plurality of transactions that occurred during the time window:

determining an account associated with the particular transaction;

determining an ultimate parent account for the account associated with the particular transaction;

comparing the ultimate parent account for the account associated with the particular transaction to the parent account for the first account to determine whether both ultimate parent accounts are the same account; and in accordance with a determination that the ultimate parent account for the account associated with the particular transaction matches the parent account for the first account, using a transaction record for the particular transaction as the second transaction record.

17. A non-transitory computer-readable storage medium storing instructions that, when executed by one or more hardware processors of a machine, cause the machine to perform operations comprising:

accessing a first transaction record, the first transaction record listing a first account associated with a first transaction, the first transaction being categorized into a first category;

determining a parent account of the first account, the parent account being a non-educational organization that is the highest in a hierarchy of non-educational organizations that includes the first account, the determining being based on analyzing an account record associated with the first account;

identifying a second transaction record associated with a second account, the second account having the same parent account as the first account, the second account being included in the hierarchy of non-educational organizations;

comparing a first billing address of record for the first account to a second billing address of record for the second account;

in accordance with a determination that the first billing address of record matches the second billing address of record, aggregating the first transaction and a second transaction listed in the second transaction record into a combined transaction; and responsive to aggregating the first transaction and the second transaction listed in the second transaction record into the combined transaction, categorizing the combined transaction into a second category, the second category being different from the first category.

18. The non-transitory computer-readable storage medium of claim 17, wherein the operations for analyzing the account record associated with the first account to determine the parent account of the first account further comprise operations for:

determining whether the account record associated with the first account lists a parent account for the first account;

in accordance with a determination that the account record associated with the first account lists a parent account for the first account, determining whether an account record associated with the parent account for the first account lists a parent account; and continuing to identify parent accounts until an ultimate parent account is determined.

19. The non-transitory computer-readable storage medium of claim 18, wherein the operations further comprise:

updating the account record associated with the first account to list the ultimate parent account as the parent account of the first account.

20. The non-transitory computer-readable storage medium of claim 19, wherein the operations further comprise:

in accordance with a determination that the account record associated with the first account does not list a parent account, updating the account record associated with the first account to, at least temporarily, list the first account as the parent account.

* * * * *